Dec. 19, 1922.

C. L. SIMON.
HEADLIGHT SHIELD.
FILED JULY 7, 1921.

1,439,193.

INVENTOR
C. L. Simon
BY Munn &Co.
ATTORNEYS

Patented Dec. 19, 1922.

1,439,193

UNITED STATES PATENT OFFICE.

CHARLES LAWRENCE SIMON, OF CEDAR RAPIDS, IOWA.

HEADLIGHT SHIELD.

Application filed July 7, 1921. Serial No. 482,978.

*To all whom it may concern:*

Be it known that I, CHARLES L. SIMON, a citizen of the United States, and a resident of Cedar Rapids, in the county of Linn and State of Iowa, have invented a new and useful Improvement in Headlight Shields, of which the following is a full, clear, and exact description.

My invention relates to improvements in headlight shields of the type of construction in which a plurality of telescopically arranged sections are supported for movement across the face of a headlight casing, and it consists in the combinations, constructions and arrangements herein described and claimed.

An object of my invention is to provide a device of the character described in which means are provided for positively operating the shield member from the body of a vehicle carrying the headlight.

A further object of my invention is to provide a device of the character described in which the telescopic sections are normally automatically held in adjusted positions with respect to one another and to the headlight casing.

A further object of my invention is to provide a headlight shield comprising a plurality of telescopically arranged sections supported on a headlight casing for movement relative to the face of the latter to cut off as much of the light as desired.

A further object of my invention is to provide a device having means operable from the seat of a vehicle carrying the headlights to which the device is applied for shielding the upper portions of the faces of a plurality of headlights simultaneously to a like extent in order to cut off a like amount of light from each headlight.

Other objects and advantages will appear in the following specification, and the novel features of the invention will be particularly pointed out in the appended claim.

My invention is illustrated in the accompanying drawings, forming part of this application, in which—

Figure 1:
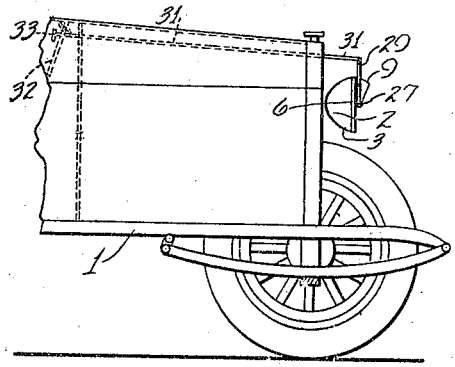
Figure 2:
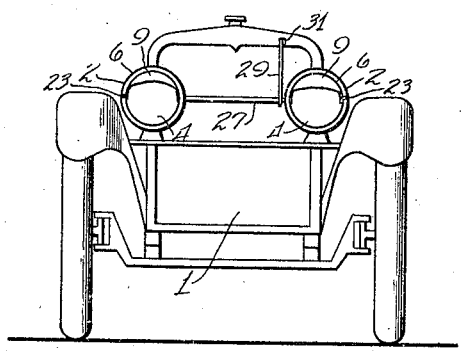
Figures 3, 4, 5:
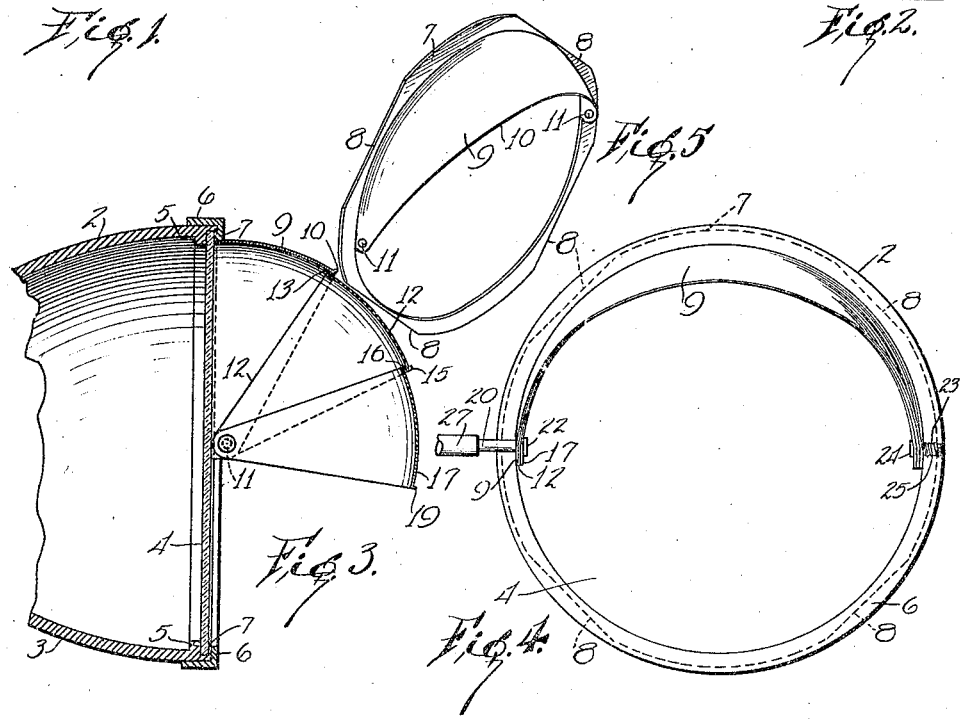
Figure 6:
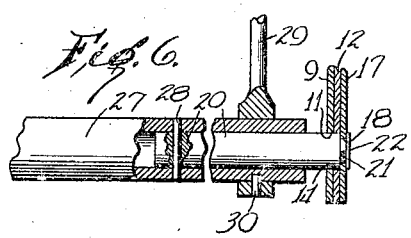
Figure 7:
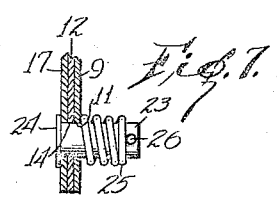

Fig. 1 is a side elevation of the front end portion of an automobile equipped with my invention, Fig. 2 is a front view of the same, Fig. 3 is a sectional view through a headlight and through a portion of the shield, the sections of the latter being shown in extended positions, Fig. 4 is a front view of the mechanism shown in Fig. 3, the sections of the shield being illustrated telescoped or in retracted positions, Fig. 5 is a perspective view of the shield member, Figs. 6 and 7 are enlarged details, partly in section, of the shield member and the means for adjustably supporting the sections at opposite sides.

Referring now to the drawings, 1 denotes an automobile provided with headlight lamps 2—2. The lamps are of conventional construction and each comprises a casing 3 and a lens 4 that is held on a seat 5 at the front end of the casing by a rim flange 6 in the usual known manner.

A disk 7 has an outer diameter approximately the same as that of the lens 4 and an inner diameter slightly less than that of the rim flange 6. This disk is stamped from a light metal, such as aluminum or brass, and may be cut away along the outer edge at a plurality of points, as indicated at 8, for a purpose which will be hereinafter set forth. The disk 7 is formed with an integral visor-like extension 9 having the general shape of a segment of a sphere and projecting laterally of the disk 7 from a part of its inner edge.

The extension 9 is bent or formed otherwise into T-shape along its outer edge, as indicated at 10 and is formed with alined diametrically opposed openings 11—11 adjacent to its opposite ends. The extension 9 constitutes one of the sections of the shield proper and the disk 7 is arranged between the rim flange 6 and the lens 4 so that the extension 9 will be positioned at the upper part of the headlight casing. In headlights of certain types of known construction, lugs (not shown) are provided as a part of the lamp casing for engaging the outer face of the lens at its edge and the outer edge of the disk 7 has been cut away at 8 to permit adjustment of the disk to lamp casings provided with such lugs as well as to the types of lamp casings from which the lugs are omitted.

A section 12 that conforms in contour with the extension 9 and is of a size to be telescoped in the latter is bent or otherwise formed to provide a radially projecting flange 13 along its inner edge adapted to cooperate with the inwardly extending arm or flange of the T-sectioned portion 10 of the extension 9, whereby disengagement of the extension 9 by the section 12 is prevented when the latter is arranged in adjusted position with respect to the extension 9, as illustrated (see Fig. 3). The section 12 is provided with alined openings 14—14 adjacent to its ends adapted to register with the openings 11—11. The section 12 is formed to provide a T-shaped portion 15 along its outer edge. A radially extending flange 16 along the inner edge of a section 17 cooperates with the inwardly extending flange of the T-sectioned portion 15 to prevent disengagement of the section 12 by the section 17. The latter conforms in curvature with the section 12 and is of a size adapted to be telescoped into the latter, being also provided with opposite openings 18—18' (the latter being non-circular) adapted to register with the openings 11—11 and 14—14. The section 17 is provided with a flange 19 projecting radially from its outer edge.

A rock shaft 20 (see Figs. 4 and 6) is journalled in the registering openings 11—14 at one end of the extension 9 and a reduced non-circular end portion 21 is projected through the non-circular opening 18' and upset at its end, as at 22. A short shaft 23 is projected through the registering openings 11—14—18 at the other end of the extension 9 and upset at its end, as at 24. A spring 25 is disposed between a pin 26 projected transversely through the short shaft 23 and the adjacent side of the extension 9 and exerts a tension on the shaft resulting in the frictional engagement of contiguous surfaces of the several sections, whereby the sections 12 and 17 will be held normally in adjusted relative positions.

It will be understood that a shield member having the construction described will be applied to each of the headlights 2—2. An adjustable connecting sleeve 27 has a bore adapted to receive the adjacent ends of the rock shafts 20 and is fixedly secured to the latter, as by means of pins, such as indicated at 28. A rocker arm 29 is fixedly secured at one end to the sleeve 27, as by means of the key 30. A slidable operating rod 31 is pivotally attached to the rocker arm at its other end and is projected between the radiator proper and the radiator casing of the automobile 1 to project through the dashboard 32 of the latter. The operating rod 31 is provided with a knob 33 adapted to be conveniently grasped by the driver of the automobile 1 who may manipulate the rod 31 to operate the sections 17 and 12 without leaving his seat.

From the foregoing description of the various parts of the device, the operation thereof may be readily understood. When the sections 17 and 12 are in the positions illustrated in Fig. 3, a pull on the rod 31 will rock the arm 29, thereby rotating the sleeve 27 and causing the section 17 to be telescoped into the section 12. When the flange 19 has been moved into contact with the T-sectioned outer edge portion of the section 12, the latter will be telescoped into the extension 9 when the movement of the rod 31 is continued. The action of the spring 25 will hold the sections 17 and 12 in the various relative positions into which they may be moved. The engagement of the T-sectioned portion of the section 12 with the T-sectioned portion of the extension 9 will prevent such a movement of the section 12 as might cause the latter to forcibly contact the lens 4. When the rod 31 is moved in the opposite direction, that is, pushed away from the driver, the sections 17 and 12 are moved in the order named from the positions illustrated in Fig. 4 toward the positions illustrated in Fig. 3.

It will therefore be readily apparent that the sections 17 and 12 may be positively operated at will as desired to cut off as much of the light projected ahead of the automobile 1 by the lens 4 as the condition of the service requires. The extension 9 and the sections 17 and 12 also serve as reflectors and serve to reflect the rays of light downwardly in front of the automobile, thereby permitting the utilization of all light projected by lamps without causing any glare that might blind a motorist approaching the automobile 1 from the front. Obviously, I may provide a greater or less number of the sections described and may make such other modifications and adaptations of the form of the device illustrated as do not depart from the spirit and scope of the invention.

I claim:

The combination with a pair of headlights, of a ring-shaped disc secured to each headlight, said disc having an integral visor-like portion projecting forwardly from its inner edge, a pair of visor-like members adapted to telescope within said visor-like portion and being pivotally secured at their ends to the ends of said visor-like projection, yielding frictional means for holding said members in adjusted position, said members operatively engaging with each other when extended or telescoped within the adjacent member, and means for actuating the inner swingable member, said means comprising a pin rigidly secured to the inner movable member of each headlight, a sleeve disposed over said pins and rigidly secured thereto, an arm for actuating said sleeve, and an actuating rod pivotally secured to said arm.

CHARLES LAWRENCE SIMON.